(12) United States Patent
Davies

(10) Patent No.: US 12,208,398 B2
(45) Date of Patent: Jan. 28, 2025

(54) WEAR LINER ASSEMBLY

(71) Applicant: BRIAN INVESTMENTS PTY LTD., Malaga (AU)

(72) Inventor: Brian Davies, Esperance (AU)

(73) Assignee: METSO OUTOTEC FINLAND OY, Tampere (FI)

( * ) Notice: Subject to any disclaimer, the term of this patent is extended or adjusted under 35 U.S.C. 154(b) by 316 days.

(21) Appl. No.: 16/308,606

(22) PCT Filed: Jun. 8, 2017

(86) PCT No.: PCT/AU2017/050576
§ 371 (c)(1),
(2) Date: Dec. 10, 2018

(87) PCT Pub. No.: WO2017/210747
PCT Pub. Date: Dec. 14, 2017

(65) Prior Publication Data
US 2019/0151855 A1    May 23, 2019

(30) Foreign Application Priority Data
Jun. 8, 2016  (AU) .................. 2016902242

(51) Int. Cl.
*B02C 17/22*  (2006.01)
*F16B 5/06*  (2006.01)
(Continued)

(52) U.S. Cl.
CPC ............ *B02C 17/22* (2013.01); *B02C 17/225* (2013.01); *F16B 5/0642* (2013.01); *F16B 35/06* (2013.01); *F16B 43/00* (2013.01)

(58) Field of Classification Search
CPC ..... B02C 17/22; B02C 17/225; F16B 5/0642; F16B 35/06; F16B 43/00
(Continued)

(56) References Cited

U.S. PATENT DOCUMENTS 2,216,784 A * 10/1940 Payne ..................... B02C 17/22
29/525.14
2,227,905 A * 1/1941 Keenoy ................. B02C 17/225
220/62.11
(Continued)

FOREIGN PATENT DOCUMENTS

AU    2010100136 A4    3/2010
EP    0272020 A1    6/1988
(Continued)

OTHER PUBLICATIONS

Bisco, What is a Threaded Insert?, Jan. 13, 2016, Bisco Industries Blog (Year: 2016).*
(Continued)

*Primary Examiner* — Mohammed S. Alawadi
(74) *Attorney, Agent, or Firm* — MH2 Technology Law Group, LLP

(57) ABSTRACT

The present invention provides a wear liner assembly (13) adapted to be secured to a structure (15). The wear liner assembly comprises a wear liner (14) having a first material secured to a backing plate (17). The backing plate has at least one hole (43) therethrough. A first fastener portion is adapted to co-operate with a second fastener portion for securing the wear liner to the structure. The first fastener portion is received in the at least one hole and is at least partially housed within the wear liner.

34 Claims, 9 Drawing Sheets

(51) Int. Cl.
*F16B 35/06* (2006.01)
*F16B 43/00* (2006.01)

(58) Field of Classification Search
USPC ................................................ 241/182, 300
See application file for complete search history.

(56) References Cited

U.S. PATENT DOCUMENTS

| | | | | | |
|---|---|---|---|---|---|
| 2,687,230 | A | * | 8/1954 | McPherson | E01C 19/104 220/23.9 |
| 3,580,520 | A | * | 5/1971 | Myers | B02C 17/22 241/299 |
| 3,804,346 | A | * | 4/1974 | Norman | B02C 17/225 241/182 |
| 3,844,492 | A | * | 10/1974 | Smallwood | B02C 17/22 241/181 |
| 4,319,719 | A | * | 3/1982 | Larsen | B02C 17/22 241/183 |
| 4,678,530 | A | * | 7/1987 | Eroskey | B02C 17/225 156/245 |
| 4,946,110 | A | * | 8/1990 | Harris | B02C 17/22 241/282 |
| 6,082,646 | A | * | 7/2000 | Clarke | B02C 17/22 241/300 |
| 6,938,385 | B2 | * | 9/2005 | Lind | B32B 17/10293 52/204.7 |
| 7,877,948 | B2 | * | 2/2011 | Davies | B65D 90/043 52/506.05 |
| 8,608,094 | B2 | * | 12/2013 | Blatton | B02C 17/22 241/21 |
| 8,777,535 | B2 | * | 7/2014 | Manahan | F16B 2/10 411/166 |
| 2009/0230226 | A1 | * | 9/2009 | Musselman | B02C 7/11 241/298 |
| 2010/0127109 | A1 | * | 5/2010 | Moller | B02C 17/225 241/182 |
| 2014/0319256 | A1 | * | 10/2014 | Knight | B02C 17/22 241/182 |
| 2015/0028142 | A1 | * | 1/2015 | Coray | B02C 23/00 241/300 |

FOREIGN PATENT DOCUMENTS

| | | | | | |
|---|---|---|---|---|---|
| GB | | 1098741 A | * | 1/1968 | ............ B02C 17/22 |
| WO | WO-2010108229 A1 | * | 9/2010 | ............ F16B 5/0642 |
| WO | WO-2015024053 A1 | * | 2/2015 | ............ F16B 37/125 |

OTHER PUBLICATIONS

Heramb Bal (Authorized Officer), International Search Report dated Sep. 11, 2017, PCT Application No. PCT/AU2017/050576, filed Jun. 8, 2017, pp. 1-4.
Heramb Bal (Authorized Officer), Written Opinion of the International Search Authority dated Sep. 11, 2017, PCT Application No. PCT/AU2017/050576, filed Jun. 8, 2017, pp. 1-9.
Ashish Tayshetye (Authorized Officer), Written Opinion of the International Preliminary Examining Authority dated Aug. 20, 2018, PCT Application No. PCT/AU2017/050576, filed Jun. 8, 2017, pp. 1-11.

* cited by examiner

WEAR LINER ASSEMBLY

CROSS-REFERENCE TO RELATED APPLICATIONS

This application is a U.S. National Stage application of PCT/AU2017/050576 filed 8 Jun. 2017, which claims priority to Australian Application No. 2016902242 filed 8 Jun. 2016, the entire disclosures of which are hereby incorporated by reference in their entireties.

TECHNICAL FIELD

The present invention generally relates to a wear liner assembly. In particular the invention relates to a wear liner assembly which can be secured to a structure using a fastening system.

BACKGROUND ART

Wear liners are used extensively throughout the materials handling industry, particularly the mining industry, to protect those parts of structures which are exposed to wear. In some applications it is desirable to install a composite wear liner comprising a first layer of material secured to a metal backing plate, wherein the first layer is of a material which has suitable properties for the desired application. For example, where the structure is exposed to a highly abrasive material but minimal impact, a composite wear liner comprising an outer ceramic tile(s) secured to a metal backing plate may be preferred over a wear liner made of metal only. Alternatively, in some applications, rubber, polyurethane or other materials attached to a metal backing plate may be preferred due to the particular attributes of these materials.

Due to their very nature, wear liners are sacrificial and require regular replacement as they wear to a level where they no longer serve their purpose.

As wear liners need to be replaced from time to time it is important that the wear liners can be readily installed and removed. It is also important that, once installed, wear liners are held firmly in place during their service cycle in order to operate effectively in harsh operating conditions. Take, for example, ceramic wear liners. These liners must be positioned so that the spacing between adjacent liners is small. If these liners are not held firmly in place, movement of the liners relative to one another can cause the liners to knock into each other and damage the brittle ceramic tile.

Ceramic and other composite wear liners are typically fastened to the structure using a stud and fastener (e.g. nut) arrangement, wherein the backing plate has several rearwardly extending, threaded studs welded thereto. Each stud is positioned to align with a hole in the structure which, once the stud has passed through, receives a nut to secure the wear liner in position. Installation and removal of this form of wear liner relies on an operator being able to access both the inside and the rear side of the structure. In order to remove and properly install wear liners which require access to both sides of the structure, expensive scaffolding and/or lifting apparatus are generally required. This is time consuming and costly.

There are also numerous applications where only the inside of a structure may be easily accessed, particularly after the plant has been installed. Having access to only the inside limits the options available for wear liner material selection and/or the method of attaching the wear liner to the structure.

Stud and nut fastener arrangements also have other disadvantages which relate specifically to the stud. The weld that holds the stud to the backing plate can be a point of weakness during handling, installation and removal. It is not uncommon for studs to break off from the backing plate.

Alternative wear liner attachment methods with composite wear liners are also problematic. A common method for attaching steel wear liners is to weld the liners to the structure they protect. Whilst this provides a robust means to secure wear liners in place, especially when access to the rear is limited, the process of installing and removing the wear liners is a very laborious, hazardous and time consuming task and is generally not the method of choice. This is also rarely used as an attachment method for ceramic or polymer based composite wear liners.

For those methods using a conventional bolt and nut fastening system to secure the wear liner to the structure, allowance must be made so that the bolt can be inserted into the wear liner. In order to pass a bolt through a liner and position the head below the liner's outer wear surface, the wear liner needs a hole in the wear material at least large enough to accommodate the head. This can be problematic, as large holes in the wear liner material typically result in premature wear around the hole and may need to be filled with an appropriate material. Depending upon the material that the wear liner is composed of, this may be difficult to do without compromising the performance of the wear liner or the function of the fastener.

Furthermore, where the bolt head lies within the body of the wear material, the performance of the wear liner during its service life may be reduced. For instance, the bolt head may have different wear properties to the surrounding wear material. Once the wear material has worn to a level which exposes the bolt head the bolt may wear at a different rate to the wear material. In the case of a ceramic wear liner, the bolt head may wear quicker than the ceramic material, creating undesirable preferential wear of the bolt and the area around bolt locations. Similarly, if the liner material is composed of polyurethane or rubber, a steel bolt may have undesirable qualities compared to these materials.

Also, if the head of the bolt is exposed to wear forces as the wear liner material is worn away, this will potentially affect the function of the liner and/or bolt. Wearing of the bolt head may result in premature release of the fastener and subsequent failure of the liner, or it may require that the liner is replaced before it has reached its optimal wear life. If the bolt head is damaged by wear during service, it may also result in difficulty in releasing the fastener when the liner is to be removed.

In the case of ceramic composite wear liners in particular, it is also not feasible to use a conventional fastening arrangement. This is because the clamping forces created when tightening the fastener are transferred through the ceramic and increase the load thereon. As ceramic is brittle, these clamping forces can lead to the ceramic material fracturing and the wear liner failing.

The preceding discussion of the background art is intended to facilitate an understanding of the present invention only. The discussion is not an acknowledgement or admission that any of the material referred to is or was part of the common general knowledge as at the priority date of the application.

SUMMARY OF INVENTION

It is an object of this invention to provide to a wear liner assembly which ameliorates, mitigates or overcomes, at least one disadvantage of the prior art, or which will at least provide the public with a practical choice.

The present invention provides a wear liner assembly adapted to be secured to a structure, the wear liner assembly comprising:
 a wear liner comprising a first material secured to a backing plate, the backing plate having at least one hole therethrough;
 a first fastener portion adapted to co-operate with a second fastener portion for securing the wear liner to the structure,
 wherein the first fastener portion has a first end portion encapsulated and retained within the wear liner and a second end portion extending through the at least one hole.

Preferably the first material is in the form of a first material layer.

Preferably the first fastener portion comprises a bolt, wherein at least a bolt head of the bolt and a first portion of a shank extending from the bolt head are housed within the wear liner. Preferably a second portion of the shank distal from the bolt head extends away from the backing plate through the at least one hole. As would be obvious to a person skilled in the art, for each first fastener portion there is an associated hole in the backing plate.

The structure may include any piece of machinery or equipment where a surface of the structure is exposed to wear.

The first material layer may be a first wear layer. The first wear layer may comprise multiple layers of the same or different materials. The first wear layer may provide an outer wear surface which is exposed to abrasive material passing through the structure. The first wear layer may provide an outer wear surface made form a material having high wear resistant properties.

The present invention provides a wear liner assembly adapted to be secured to a structure, the wear liner assembly comprising a wear liner and a first fastener portion adapted to co-operate with a second fastener portion for securing the wear liner to the structure, the first fastener portion being fixedly retained relative with the wear liner such that the first fastener portion cannot be removed therefrom, the wear liner comprising a wear layer mounted to a backing plate having at least one hole therethrough whereupon securing the wear liner to the structure the first fastener portion clampingly engages the backing plate to secure the wear liner to the structure. As a result of this arrangement all clamping loads are transferred through the backing plate, minimising the likelihood of any damage being caused to the wear layer secured to the backing plate.

The present invention provides a wear liner assembly adapted to be secured to a structure, the wear liner assembly comprising:
 a wear liner comprising a first material layer secured to a backing plate, the backing plate having at least one hole therethrough;
 a first fastener portion adapted to co-operate with a second fastener portion for securing the wear liner to the structure, whereupon securing the wear liner to the structure the first fastener portion clampingly engages the backing plate to secure the wear liner to the structure.

A wear liner assembly adapted to be secured to a structure, the wear liner assembly comprising:
 a wear liner comprising a first material layer secured to a backing plate, the backing plate having at least one hole therethrough;
 a first fastener portion adapted to co-operate with a second fastener portion for securing the wear liner to the structure, the first fastener portion having a first end portion encapsulated and retained within the wear liner such that the axial movement of the first fastener portion is restricted, whereupon securing the wear liner to the structure the first fastener portion clampingly engages the backing plate to secure the wear liner.

The first material layer may be a wear layer. The wear layer may comprise multiple layers of the same or different materials. The wear layer may provide an outer wear surface which is exposed to abrasive material passing through the structure and is made from a material having high wear characteristics.

As the first fastener portion clampingly engages the backing plate to secure the wear liner to the structure the wear layer does not experience clamping/compression loads.

The first material layer may be a first wear layer.

The first fastener portion may be received in the backing plate so as to be at least partially housed within the wear liner.

The first end portion of the first fastener portion may be received in the backing plate so as to be housed within the wear liner The at least one hole of the backing plate may incorporate a recess, wherein the recess may encircle and support the first fastener portion. When assembled, the recess may receive at least an end of the first fastener portion, wherein a recess surface abuts a surface of the first fastener portion to support the first fastener portion. This will provide the largest possible support interface between the first fastener portion and the backing plate thus enabling high tension loads to be established between the first fastener portion and the structure.

The present invention provides a wear liner assembly adapted to be secured to a structure, wherein only a single side of the structure is readily or preferentially accessible to fasten or release the wear liner assembly to the structure, the wear liner assembly comprising:
 a wear liner comprising a first material layer secured to a backing plate, the backing plate having at least one hole therethrough;
 a first fastener portion adapted to co-operate with a second fastener portion for securing the wear liner to the structure,
 wherein a first end portion of the first fastener portion is retained within the wear liner.

The first material layer may be a first wear layer. The wear layer may comprise multiple layers of the same or different materials. The wear layer may provide an outer wear surface which is exposed to abrasive material passing through the structure The first wear layer may include at least one aperture therethrough, the at least one aperture in the first wear layer being axially aligned with the at least one hole in the backing plate, whereby the first fastener portion may be accessed through the aperture, the at least one aperture being smaller in diameter than the largest diameter of the first fastener portion.

The present invention provides a wear liner assembly adapted to be secured to a structure, the wear liner assembly comprising:
 a wear liner comprising a first material layer secured relative to a backing plate, the backing plate having at least one hole therethrough;
 at least one fastener assembly comprising a first fastener portion adapted to co-operate with a second fastener portion, the at least one fastener assembly adapted to secure the wear liner to the structure, wherein the first fastener portion is received in the at least one hole such that a first end portion of the first fastener portion is encapsulated and retained within the wear liner.

The at least one fastener assembly may be provided by the first fastener portion and the second fastener portion.

The first material layer may include at least one aperture therethrough, the at least one aperture in the first wear layer being axially aligned with the at least one hole in the backing plate, the at least one aperture being smaller in diameter than the largest diameter of the first fastener portion. The first fastener portion may be accessed through the aperture.

The first material layer may be a first wear layer.

The first wear layer may comprise one or more first wear units/tiles secured relative to the backing plate. As would be understood by the person skilled in the art, when the first wear layer is formed from one or more first wear units/tiles, only those units/tiles which are associated with a fastener assembly having a rotatable first fastener portion will require the aperture wherein the aperture provides access to the first fastener portion.

In one aspect of the invention the first wear layer is secured directly to the backing plate.

In another aspect of the invention the wear liner comprises one or more intermediate wear layers between the backing plate and the first wear layer. These intermediate layers may have the same or different wear properties as the first wear layer. The intermediate layers may be of different colours to provide a visual indication of wear experienced by the wear liner.

The first wear layer may be selected from a range of materials suitable to the environment and conditions in which the wear liner will be installed.

In one aspect of the invention the first wear layer is made from rubber or a rubber based material, polyurethane, plastic, or polymer based material.

In another aspect of the invention the first wear layer is made from ceramic or a ceramic based material.

In another aspect of the invention the first wear layer is made of a combination of different materials. For example the first wear layer may be made of a combination of ceramic and polymer based materials.

A first surface of the first wear layer may be secured to a first surface of the backing plate. In one embodiment the first surface of the first wear layer is bonded to the first surface of the backing plate using a bonding material.

Preferably the first surface of the first wear layer is planar.

In one aspect of the invention the first surface may be substantially continuous between its edges.

In another aspect of the invention the first wear layer has the at least one aperture therethrough. The at least one aperture may be adapted to align with the first fastening portion.

The first end portion of the first fastener portion may be located in the first wear layer. Where the first fastener portion is a bolt comprising a bolt head and a shank extending therefrom, the bolt head or an upper section of the bolt head may be located in the first wear layer. A lower section of the bolt head may be located in the backing plate.

Alternatively, the first end portion of the first fastener portion may be positioned within the thickness of the backing plate. Where the first fastener portion is a bolt comprising a bolt head and a shank extending therefrom, the bolt head may be located in the backing plate.

The first fastener portion may extend into the bonding material. Where the first fastener portion is a bolt comprising a bolt head and a shank extending therefrom, an upper section of the bolt head may be located in the bonding material. A lower section of the bolt head may be located in the backing plate.

The first end portion of the first fastener portion may be positioned in the backing plate, and extend through the at least one hole therethrough.

The axial movement of the first fastener portion may be limited by the first surface of the first wear layer or the bonding material The first fastener portion may comprise a bolt having a bolt head and a shank wherein the bolt head provides the first end portion of the first fastener portion, and the shank provides a second end portion of the first fastener portion, the bolt head being retained within the wear liner and the shank passes through the at least one hole in the backing plate, extending rearwardly therefrom. The shank may be threadingly received in the bolt head.

The fastener assembly may further comprise an insert which is received in the backing plate. The insert may provide a recess which supports the bolt. The insert may receive the bolt therethrough. The bolt head may be seated in the insert such that the upper surface of the bolt head sits below the top of the insert. The insert may have a countersunk region which supports the bolt head.

In one aspect of the invention the insert is secured to the backing plate. The insert may be fixed in the recess such as by bonding with an adhesive, welding, creating an interference fit therebetween or by any other means as would be known by the person skilled in the art. The at least one hole of the backing plate may have a shoulder therein. The insert may be received in the at least one hole and abut the shoulder.

In another aspect of the invention the insert is threadingly received in the backing plate. The insert may be threadingly received in the at least one hole which is in the form of a threaded aperture which passes through the backing plate. The insert may be configured, such as for example having one or more dimples, for receiving a tool wherein the tool may rotatably position the insert in place. This aspect allows the first material layer to be secured to the backing plate before the insert and fastener assembly are positioned therein. As an alternative to having threaded engagement, the insert may be fixed to the at least one hole by welding, creating an interference fit therebetween or by any other means as would be known by the person skilled in the art.

In those arrangements where the thickness of the insert is thicker than the backing plate, the insert may extend into the bonding material located between the backing plate and the first material layer. This allows the rear surface of the backing plate to remain planar, allowing for better contact with the structure once fitted.

In one variation the head of the bolt is retained within the wear liner such that it is freely rotatable. The head may be retained within the wear liner such that no portion of the head extends beyond the boundaries of the wear liner. An underside of the head may be flush with a first surface of the wear liner. Alternatively an underside of the head may be inward of a first surface of the wear liner.

In one aspect of the invention the head has a tool recess adapted to co-operate with a tool for rotating the bolt.

The at least one aperture of the first wear layer may align with the tool recess of the bolt head.

The diameter of the aperture in the first wear layer may be smaller than the diameter of the head and larger than the diameter of that portion of the tool which enters the aperture.

The size of the at least one aperture has a significant effect on the wear resistance of the first wear layer. For example, consider when the first wear layer is ceramic. Due to the properties of ceramics when the ceramic layer/tile has an aperture therein the rate of wear tends to increase in that location, the larger the aperture the greater the rate of wear in that region. Therefore, it is highly desirable that the first material present a substantially continuous surface to the material passing through/over the structure, or at least a surface with minimal interruptions therein.

Preferably the aperture is sealed once the wear liner is secured to the structure. The aperture may be unsealed, so as to allow a tool to access the bolt, when the wear liner is required to be removed. The aperture may be sealed by a plug suitably secured therein such as by bonding, friction or material welding. When the aperture is unsealed the plug or a portion thereof may be removed. In removing the plug the plug may be removed as a substantial whole plug or may disintegrate. The plug may be removed mechanically, chemically or by any other means.

In one form, the plug comprises an elongate element adapted to be pressed fit into the aperture.

In another form, the plug comprises an elongate element which is larger in diameter than the aperture.

In another form, the plug comprises an elongate element having a plurality of flexible, annular skirts at spaced apart intervals. The annular skirts are larger in diameter than the diameter of the aperture the plug is received. The first end of the plug may be hollow, such that upon engagement with the bolt head the first end collapses. The hollow first end may be filled with a sealing medium such as grease. The sealing medium may be ejected from the hollow end to fill any cavity therearound as the hollow end collapses. Alternatively the first end of the plug may be formed to be snugly received in the tool recess in the bolt head. The first end may be coated with a lubricant or similar to be located therein.

The plug may be made from a material which incorporates at least one colour change along its longitudinal length. As the plug wears the colour change will provide a visual wear indicator which is indicative of the wear of the first wear layer. Once inserted in the aperture the annular skirts form a barb like engagement with the sidewalls of the aperture to hold the plug in place. The plug may also be glued in place.

The plug may house a wear sensor therein for detecting wear of the wear liner. The wear sensor may transmit wear data relating to a monitoring point.

In a second variation the head of the bolt is retained within the wear liner such that the bolt is rotatably fixed. In this variation there is no requirement of an aperture in the first wear layer as the bolt is not rotatable and therefore no tool access is required.

The bolt may be keyed relative to the insert in the backing plate to prevent rotation of the bolt once the head is received in the insert. Preferably the degree of axial movement of the bolt in the wear liner is less than the axial movement required to disengage the bolt from the insert in a manner whereby the bolt is no longer keyed relative to the insert.

The bolt may be in the form of a plough head bolt.

In a third variation the insert is integral with the bolt head, wherein the combined insert and bolt head are threadingly received in the at least one hole which is in the form of a threaded aperture which passes through the backing plate.

As the insert and bolt head are integral, once received in the at least aperture the bolt head is fixed in place.

An upper surface of the head may engage the first surface of the first wear layer to limit axial movement of the bolt.

In a second aspect of the invention the first end portion of the first fastener portion is in the form of a nut, wherein the nut is retained within the wear liner and positioned such that the threaded hole of the nut aligns with the at least one hole of the backing plate. In this aspect a threaded rod may pass through the at least one hole of the backing plate and threadingly engage the nut.

In one variation of this second aspect the nut is retained within the wear liner such that it is freely rotatable.

The first wear layer may have an aperture therethrough which aligns with a tool recess of the nut.

The diameter of the aperture in the first wear layer may be smaller than the diameter of the nut and larger than the diameter of that portion of the tool which enters the aperture.

The aperture may be adapted to be sealed once the wear liner assembly is assembled or the wear liner is secured to the structure. The aperture may be easily unsealed so as to allow a tool to access the nut when the wear liner is required to be removed. The aperture may be sealed by a plug suitably secured therein such as by bonding, friction or material welding. When the aperture is unsealed the plug or a portion thereof may be removed. In removing the plug the plug may be removed as a substantial whole plug or may disintegrate. The plug may be removed mechanically, chemically or by any other means In a second variation of this second aspect the nut is retained within the wear liner such that it is rotatably fixed. In this variation the recess may have a complementary shape to the external shape of the nut. In this variation there is no requirement for the first wear layer to have an aperture therein. Therefore the outer surface of the first wear layer may be continuous.

The present invention further provides a wear liner assembly adapted to be secured to a structure, the structure having a plurality of openings for securing the wear liner assembly thereto, the wear liner assembly comprising:
  a wear liner comprising a first wear layer secured to a backing plate;
  at least one releasable fastener assembly for securing the wear liner to the structure, the at least one releasable fastener assembly comprising:
  a first fastener portion in the form of a bolt head, retained within the wear liner whereby the bolt head is rotatable therein, and a shank, having a threaded portion, the shank protruding rearwardly of the backing plate;
  a second fastener portion comprising a locking element rotatably positioned on the shank, the locking element being adapted to operatively engage one of the openings in the structure such that during fastening of the fastener, the locking element rotates between a first position and a second position such that the wear liner and structure are clampable between the bolt head and the locking element.

The fastener assembly may further comprise an insert which is received in the backing plate. The insert may be countersunk to receive the bolt. The bolt may be received in the insert such that the upper surface of the bolt sits below the top of the insert.

In one aspect of the invention the insert is secured to a hole in the backing plate. The insert may be fixed in the hole such as by welding between the insert and the rear face of the backing plate. Alternatively the insert may be fixed in the hole by bonding, creating an interference fit therebetween or by any other means as would be known by the person skilled in the art.

In another aspect of the invention the insert is threadingly received in the backing plate. The insert may be threadingly received in a threaded hole which passes through the backing plate. The insert may be adapted to receive a tool wherein the tool may rotatably position the insert in place. In this aspect the first material layer may first be secured to the backing plate, before the insert and fastener assembly are positioned therein. The insert may be countersunk to receive the bolt. The bolt may be received in the insert such that the upper surface of the bolt sits below the top of the insert.

In another aspect of the invention the insert may be thicker than the backing plate. The hole in the backing plate may be recessed into the bonding material to enable the insert to be fully received into the backing plate and ensure a flush surface on the back of the backing plate. The insert may be countersunk to receive the bolt. The bolt may be received in the insert such that the upper surface of the bolt sits below the top of the insert.

Preferably when the locking element is in the first position the second fastener portion may be received in or removed from the opening of the structure. Preferably when the locking element is in the second position the fastener assembly can be fastened such that the wear liner and structure are clampable between the bolt head and the locking element. When fastening the fastener assembly, once the locking element has been rotated from the first position to the second position, the locking element is prevented from further rotation in that direction. When unfastening the fastener assembly, once the locking element has been rotated from the second position to the first position, the locking element is prevented from further rotation in that direction.

The wear liner assembly may comprise a prevention means to prevent the second fastener portion from passing completely through the opening in the structure when received therein.

Preferably the prevention means ensures that, during installation of the releasable fastener assembly, a restraining portion of the locking element remains within the opening of the structure, wherein the restraining portion of the locking element is configured to prevent rotation of the locking element beyond the second position, when fastening the fastener assembly.

Preferably the prevention means ensures that during unfastening of the releasable fastener assembly, the restraining portion of the locking element remains within the opening of the structure, wherein the restraining portion of the locking element is configured to prevent rotation beyond the first position.

In addition the prevention means ensures that the second fastener portion cannot pass through the opening of the structure when installing or removing the wear liner. For example, this will prevent the second fastener portion from falling from the rear side of a vertical structure during installation or removal of the wear liner.

In one aspect of the invention the prevention means is in the form of a restriction element which provides an obstruction preventing the second fastener portion from passing entirely through the opening, ensuring the restraining portion of the locking element remains within the opening of the structure.

In one variation of this aspect the restriction element is in the form of an enlarged portion wherein the smallest diameter of the enlarged portion is greater than the smallest dimension of the opening.

The restriction element may be integral with the second fastener portion such that the distance between the restriction element and the locking element is fixed.

Alternatively the restriction element may co-operate with the second fastener portion such that the distance between the restriction element and the locking element is adjustable. The restriction element may be in the form of a sleeve which threadingly co-operates with the locking element, and is threadingly receivable on the shank.

The restriction element may be in the form of a flange located at a distal end from the locking element. The distance between the flange and the locking element is such that the restraining portion of the locking element may remain within the opening of the structure when the fastener assembly is received therein.

In one embodiment the thickness of the restriction element/flange is accommodated by a recess in an exposed surface of the backing plate or a recess in the structure.

In another variation of this aspect the restriction element is in the form of a projection spaced rearwardly from the rear side of the structure. An elongate element may secure the projection to the rear side of the structure at a position adjacent the opening. Alternatively an elongate element may secure the projection to an adapter which is received in the opening of the structure. The adapter may provide the opening which the locking element operatively engages to fasten the wear liner to the structure.

In another aspect of the invention the prevention means is in the form of a limiting means located at or adjacent to an end of the shank remote from the bolt head for preventing the second fastener portion from detaching from the shank. The limiting means may be in the form of a collar secured to or adjacent the end portion of the shank. The collar may be in the form of a metal sleeve which is crimped to or adjacent the end portion of the shank. The collar may be in many forms such as a plastic cap, a projection extending from the shank, a lockable nut. The limiting means may be sufficiently spaced from the locking element such that during at least installation of the releasable fastener the restraining portion of the locking element remains within the opening of the structure. Preferably the limiting means may be spaced from the locking element such that the distance between the locking element and the limiting means is substantially equal to the distance the locking element would travel in a quarter turn of the shank relative to the locking element.

The collar and nut may combine to provide a limiting assembly wherein the collar and nut are in predetermined spaced apart arrangement. Preferably when the limiting assembly is threadingly received on the shank and wound thereon, the distance between the collar and nut remain the same. Preferably when the limiting assembly is wound off the shank the collar remains fixed while the nut moves toward the collar until it is in abutment therewith, preventing the nut from further rotation relative to the shank. Preferably the space between the collar and nut is such that during at least installation of the fastener relative to the opening the nut has a portion which remains within the opening.

The shank may be threadingly received in the bolt head or it may be integral therewith.

The present invention further provides a wear liner assembly adapted to be secured to a structure, the structure having a plurality of openings for securing the wear liner assembly thereto, the wear liner assembly comprising:
- a wear liner comprising a first material layer secured to a backing plate;
- at least one fastener assembly for securing the wear liner to the structure, the at least one fastener assembly comprising:
  - a first portion in the form of a bolt head rotatably contained within the wear liner, whereby the bolt head is encapsulated within the wear liner,
  - a shank having a threaded portion protruding rearwardly from the backing plate;
  - a second portion in the form of a nut adapted to be threadingly received on the shank, whereby rotation of the bolt head and/or the nut moves the nut along the shank, the nut is movable between a locked position wherein the wear liner is secured to the structure and an unlocked position wherein the wear liner can be installed upon, or removed from the structure;
  - whereupon the wear liner assembly being installed on the structure an end portion of the nut passes through aligned openings therein, the nut can be moved to a locked position, wherein further rotation of the bolt head draws the nut closer thereto, to clampingly secure the wear liner to the structure.

Preferably the wear liner provides an aperture through which a tool can access the bolt head, the aperture being smaller than the bolt head.

To release the wear liner assembly from the structure each fastener assembly will need to be unlocked. In this regard reverse rotation of the bolt head causes the nut to move away from the bolt head, reducing and removing the clampingly forces acting between the wear liner and the structure. Further rotation of the bolt head will then move a locking element of the nut to an unlocked position, wherein the locking element aligns with the opening in the structure so that the wear liner assembly may be removed from the structure.

In contrast to the prior art, the wear liner assembly may be secured to the structure without requiring access to the rear of the structure. Furthermore, in order to rotate the bolt, the first material layer of the wear liner assembly only requires a small aperture for passing a tool therethrough for engaging the bolt head. By having a smaller aperture, the extent of localised wear in the region of the aperture is minimised compared to a larger aperture.

Preferably the bolt head is rotatably contained within the first material layer and/or the backing plate. The bolt head may be rotatably received at the interface of the ceramic tile and the backing plate.

Preferably the bolt head is housed in a recess formed or provided in the backing plate. This allows the first material layer to have a relatively continuous underside, providing only small apertures for the tool to access the bolt head. Also, when the wear liner assembly is secured to the structure the fastener assembly clamps the backing plate to the structure. This arrangement limits the load to the backing plate.

In one aspect of the invention the bolt head is housed in the backing plate such that an upper surface of the bolt head is below the first surface of the first wear layer and bonding material.

In another aspect of the invention the bolt head is housed in the backing plate such that the upper surface of the bolt head is flush with, or below the first surface of the backing plate. This will allow the bolt to be more easily rotated.

The bolt head may have a countersunk head having a planar upper surface.

In one aspect of the invention the recess formed or provided in the backing plate is countersunk to receive the bolt head.

In another aspect of the invention the recess is provided by an insert accommodated in the backing plate. The insert may be countersunk to receive the bolt head. The bolt head may be received in the insert such that the upper surface of the bolt head sits below the top of the insert.

The insert allows the at least one hole in the backing plate to be large enough to receive the second fastener portion. This saves time, and may be more convenient and efficient during assembly as the fastener assembly can be received in the backing plate in an assembled condition. The first material layer may be bonded to the backing plate using a bonding material.

In yet another aspect of the invention the insert is threadingly received in the backing plate. The insert may be threadingly received in a threaded hole which passes through the backing plate. The insert may be countersunk to receive the bolt head. The bolt head may be received in the insert such that the upper surface of the bolt head sits below the top of the insert. The insert may be adapted to receive a tool wherein the tool may rotatably position the insert in place. This aspect allows the first material layer to be secured to the backing plate before the insert and fastener assembly are positioned therein.

In one aspect of the invention the insert is secured to a hole in the backing plate. The insert may be fixed in the hole such as by welding between the insert and the rear face of the backing plate. Alternatively the insert may be fixed in the hole by bonding, creating an interference fit therebetween or by any other means as would be known by the person skilled in the art.

Preferably the chamfer angle of the countersunk bolt head is flatter than the chamfer angle of the countersunk recess/insert. This will improve the clamping forces being generated for a given torque application to the bolt.

Preferably the bolt is angularly displaceable relative to its longitudinal axis when received in the recess or insert. This will improve the ability to accommodate misalignment between the holes, for example, as may occur due to unevenness between the respective backing plate and structure.

The bolt head may have a tool recess adapted to receive a tool for rotating the bolt.

The first material layer may have an aperture therethrough which aligns with the tool recess of the bolt head. The aperture may be adapted to be sealed once the wear liner assembly is secured to the structure. The aperture may be easily unsealed when the wear liner assembly is required to be removed.

The wear liner assembly may comprise a prevention means to prevent the second portion from passing completely through the opening in the structure when received therein.

Preferably the prevention means ensures that, during installation of the releasable fastener assembly, a restraining portion of the nut remains within the opening of the structure, wherein the restraining portion of the nut is configured to prevent rotation of the nut beyond the locked position, when fastening the fastener assembly.

Preferably the prevention means ensures that during unfastening of the releasable fastener assembly, the restraining portion of the nut remains within the opening of the structure, wherein the restraining portion of the nut is configured to prevent rotation beyond the unlocked position.

In addition the prevention means ensures that the second portion cannot pass through the opening and fall from the rear side of the structure when installing or removing the wear liner.

In one aspect of the invention the prevention means is in the form of a restriction element which provides an obstruction preventing the second portion from passing entirely through the opening, ensuring the restraining portion of the nut remains within the opening of the structure.

In one variation of this aspect the restriction element is integral with the second portion and is in the form of an enlarged portion wherein the smallest diameter of the enlarged portion is greater than the smallest dimension of the opening. The restriction means may be in the form of a flange located at a distal end from a locking element of the nut. The distance between the flange and the locking element is such that the restraining portion of the nut may remain within the opening of the structure when the fastener assembly is received therein. Preferably the thickness of the flange is accommodated by a recess in an exposed surface of the backing plate or a recess in the structure.

In another variation of this aspect the restriction element is in the form of a projection extending across the opening wherein the projection is spaced rearwardly from the rear side of the structure. An elongate element may secure the projection to the rear side of the structure at a position adjacent the opening. Alternatively an elongate element may secure the projection to an adapter which is received in the opening of the structure. The adapter may provide the opening which the locking element operatively engages to fasten the wear liner to the structure.

In another aspect of the invention the prevention means is in the form of a limiting means located at or adjacent to the end of the shank remote from the bolt head for preventing the second portion from detaching from the shank. The limiting means may be in the form of a collar secured to or adjacent the end portion of the shank. The collar may be in the form of a metal sleeve which is crimped to or adjacent the end portion of the shank. The collar may be in many forms such as a plastic cap, a projection extending from the shank, a lockable nut. The limiting means may be sufficiently spaced from the nut such that during at least installation of the releasable fastener the restraining portion of the nut remains within the opening of the structure. Preferably the limiting means may be spaced from the nut such that the distance between the nut and the limiting means is substantially equal to the distance the nut would travel relative to the head in a quarter turn of the shank.

The collar and nut may combine to provide a limiting assembly wherein the collar and nut are in predetermined spaced apart arrangement. Preferably when the limiting assembly is threadingly received on the shank and wound thereon, the distance between the collar and nut remain the same. Preferably when the limiting assembly is wound off the shank the collar remains fixed while the nut moves toward the collar until it is in abutment therewith, preventing the nut from further rotation relative to the shank. Preferably the space between the collar and nut is such that during at least installation of the fastener relative to the opening the restraining portion remains within the opening.

In another aspect of the invention the plurality of openings in the structure are in the form of slots.

Preferably an end portion of the nut is received in each slot when in the first position, and is releasably locked relative to the slot when in the second position.

Preferably the nut comprises a first nut portion adapted to be retained within the slot and a second nut portion adapted to be retained external the slot.

The first portion may comprise two cam surfaces, the cam surfaces enable the nut to move from an unlocked condition to a locked condition while preventing continued rotation in the same direction.

The second portion comprises two arms extending outwardly relative to the first portion in an opposed relation. When the nut is in the unlocked position the arms align with the slot so that the second portion of the nut is able to pass through the slot. When the nut is in the locked position, the arms engage a surface of the structure adjacent the slots preventing the nut from passing therethrough.

Preferably the angular displacement of the second portion between the locked position and the unlocked position is less than 180°.

Preferably the angular displacement of the end portion between the locked position and the unlocked position is 90°.

The nut may have a holding means/binding means to hold the nut in the unlocked position. This will assist in ensuring the second portion of the nut remains in the unlocked position and aligned with the slot during installation and removal of the wear liner.

Preferably the limiting means is positioned such that a portion of the first portion of the nut remains within the slot once the second portion has passed through the slot. The position of the limiting means may allow a very small part of the first portion to remain in the slot, allowing for a degree of unevenness between the structure and the wear liner. Preferably the limiting means is positioned such that a portion of the first portion of the nut remains within the slot once the fastener assembly is unlocked/released.

Prior to assembly the nut may be bonded to the shank, whereby the bond is broken as the bolt is further rotated once the nut is in the locked position.

The shank may be threadingly received in the bolt head. Prior to assembly the bolt may be bonded to the shank, whereby the bond between the bolt and the shank is stronger than the bond between the shank and the nut such that the bond between the shank and the nut is broken as the bolt is rotated once the nut is in the locked position.

Alternatively the shank may be integral with the bolt head.

The present invention provides a fastener assembly for securing an object to a structure, the structure comprising a first structure surface and a second structure surface against which the object is secured, the structure having a plurality of openings, wherein each opening receives a portion of the fastener assembly therethrough, the fastener assembly comprising:
  a bolt comprising a bolt head, rotatably contained within the object, whereby the bolt head is fully encapsulated within the object to be retained therein;
  an insert contained within the object and adapted to receive and rotatably support the bolt head;
  a shank, having a threaded portion protruding from the object;
  a nut, whereby rotation of the bolt head moves the nut along the shank, the nut is movable between a locked position wherein the object is secured to the structure and an unlocked position wherein the object can be installed upon, or removed from the structure;
  whereupon the object being installed on the structure such that the nut passes through aligned openings therein, the nut can be moved to the locked position, wherein further rotation of the bolt head draws the nut closer thereto, to clampingly secure the object to the surface.

The present invention further provides a wear liner assembly adapted to be secured to a structure, the wear liner assembly comprising:
- a wear liner comprising a first material secured to a backing plate, the backing plate having at least one hole therethrough;
- a first fastener portion wherein the first fastener portion is received in the at least one hole and has a first end portion which is housed within the wear liner to be retained therein, such that the first fastener portion is not removable therefrom.

The present invention further provides a wear liner assembly adapted to be secured to a structure, the wear liner assembly comprising:
- a wear liner comprising a first material secured to a backing plate, the backing plate having at least one hole therethrough;
- a first fastener portion comprising a bolt, wherein at least a bolt head of the bolt and a first portion of a shank extending from the bolt head are housed within the wear liner to be retained therein, such that the first fastener portion is not removable therefrom.

Preferably a second portion of the shank distal from the bolt head extends away from the backing plate through the at least one hole. As would be obvious to a person skilled in the art, for each first fastener portion there is an associated hole in the backing plate.

The present invention further provides a fastener assembly for securing an object to a structure, the structure comprising a first structure surface and a second structure surface against which the object is secured, the structure having a plurality of openings, each opening is adapted to receive a portion of the fastener assembly therethrough, the fastener assembly comprising:
- a bolt comprising a bolt head rotatably contained within the object, whereby the bolt head is fully encapsulated within the object to be retained therein; the object having an aperture therein for receiving a tool for rotating the bolt head;
- the bolt also comprising a shank having a threaded portion protruding from the object;
- an insert contained within the object and adapted to receive and rotatably support the bolt head;
- a nut adapted to be threadingly received on the shank, whereby rotation of the bolt head moves the nut along the shank, the nut is movable between a locked position wherein the object is secured to the structure and an unlocked position wherein the object can be installed upon, or removed from the structure;
- whereupon the object being installed on the structure such that the nut passes through aligned openings therein, the nut can be moved to the locked position, wherein further rotation of the bolt head draws the nut closer thereto, to clampingly secure the object to the surface.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

In the drawings like structures are referred to by like numerals throughout the several views. The drawings shown are not necessarily to scale, with emphasis instead generally being placed upon illustrating the principles of the present invention.

DESCRIPTION OF EMBODIMENTS

A first embodiment of the present invention is illustrated in FIGS. 1 to 11 and provides a wear liner assembly 13 particularly suited to be secured to a structure 15, typically exposed to wear.

As will be understood in the below discussion, an advantage of this embodiment is that it allows for installation of a wear liner when only the one side of the structure to which the wear liner is to be installed is readily or preferentially accessible. For example, where the structure is a transfer chute often only the inside surface can be readily accessed by an operator. The rear side is either not accessible, or cannot be accessed without setting up scaffolding or using some form of access equipment (e.g. scissor lift, cherry picker).

Figure 1:
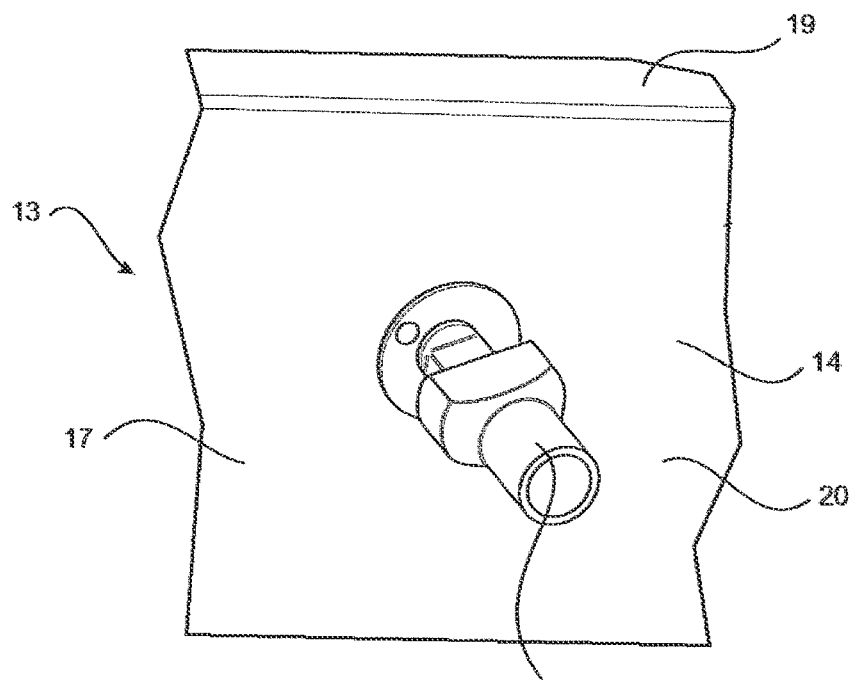
FIG. 1 is a rear perspective view of a portion of a ceramic wear liner assembly according to a first embodiment of the invention.
Figure 2:
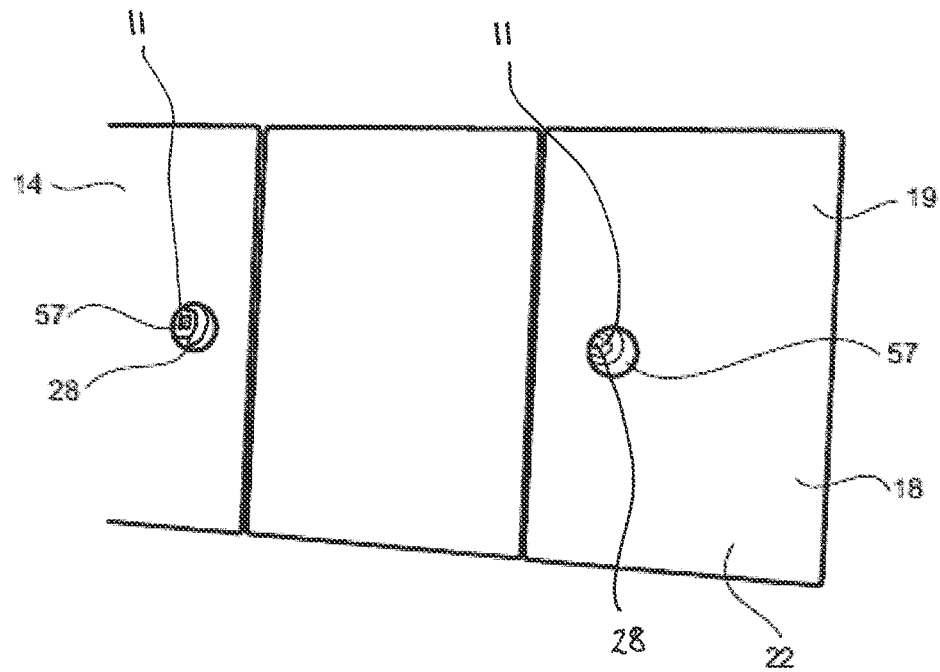
FIG. 2 is a front view of the ceramic wear liner assembly partly shown in FIG. 1 before its apertures are sealed.
Figure 3:
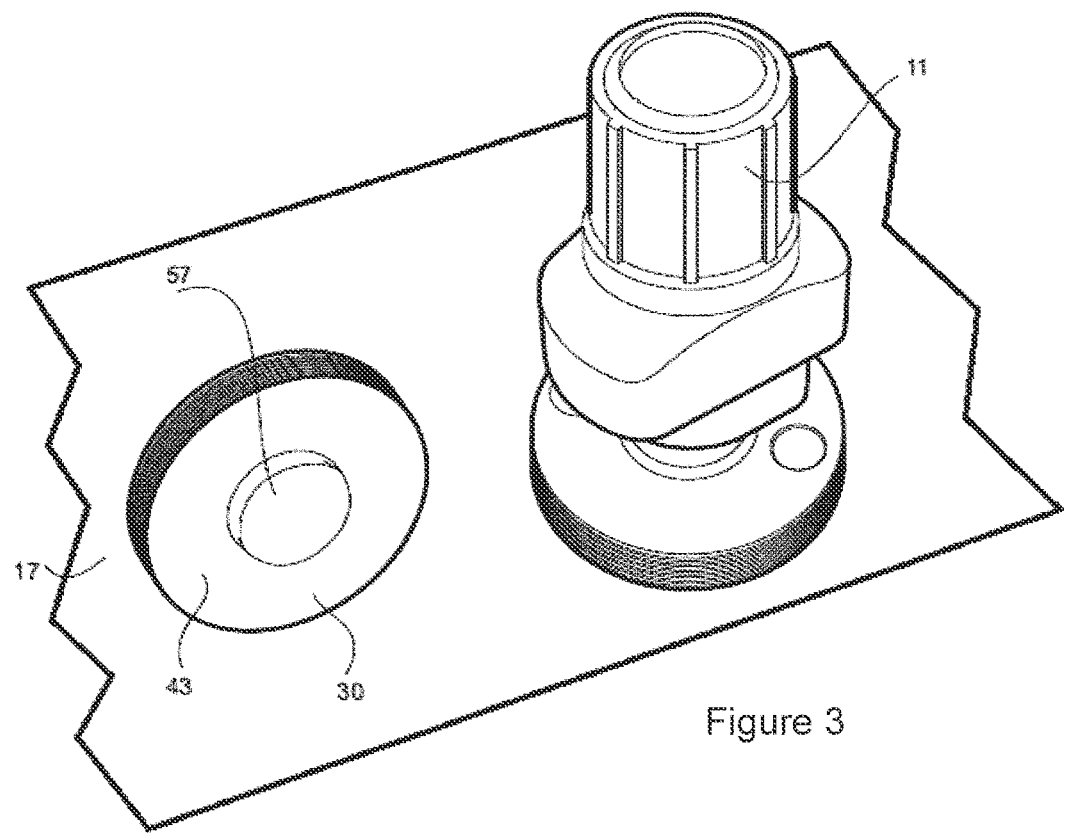
FIG. 3 is a rear view of a backing plate of the ceramic wear liner assembly of FIG. 1 before a bolt of a fastener assembly is placed in a hole.
Figure 4:
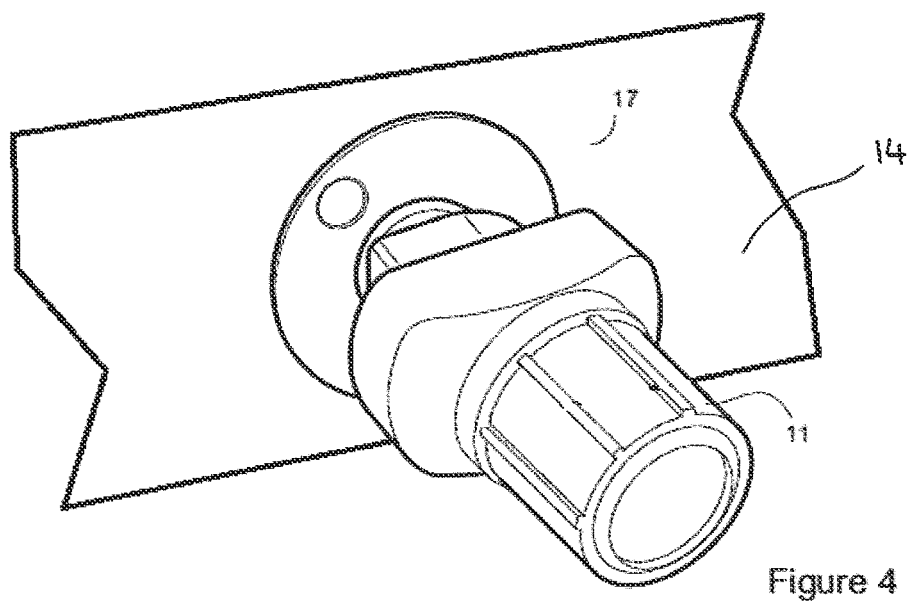
FIG. 4 is a view similar to FIG. 3 wherein the fastener assembly of the wear liner assembly is received in the backing plate.

As shown in FIG. 2 the wear liner assembly 13 comprises two releasable fastening assemblies 11, and a wear liner 14. The wear liner is formed by bonding a first material which provides a wear layer, which in this embodiment is a ceramic tile 19, to a backing plate 17 using a bonding material 30. As shown in FIG. 2, the ceramic wear liner assembly 13 of the present embodiment is represented as being relatively small. However, in reality the ceramic wear liner assembly 13 can be of any size, with the typical size being 300 mm*300 mm. Furthermore, the ceramic wear liner assembly 13 can have any number of releasable fastening assemblies 11 but generally two fastener assemblies are sufficient to secure a 300 mm*300 mm ceramic wear liner.

Each releasable fastening assembly 11 is specifically designed to secure the wear liner 14 to the structure 15, whereby the fastener assembly 11 allows the wear liner 14 to be easily installed and removed. Hence the invention also has application where a quick change out of the wear liner is desirable.

Figure 5:
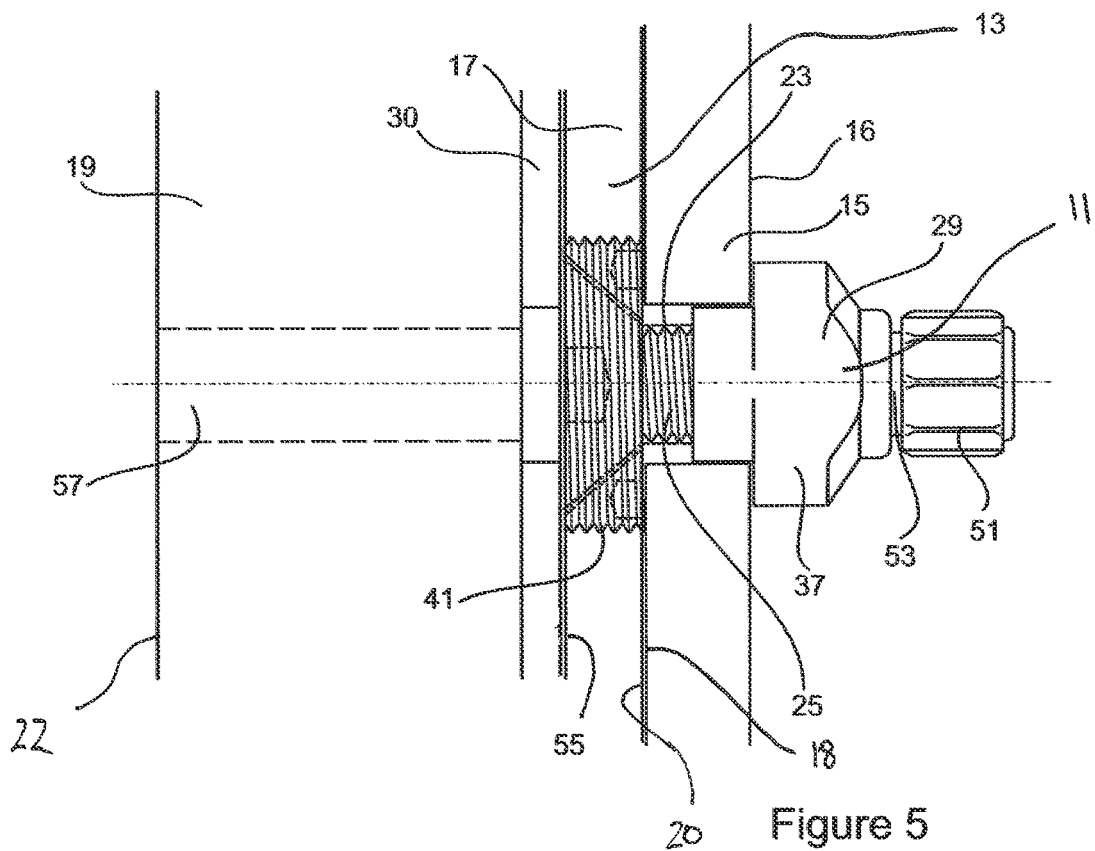
FIG. 5 is a cross sectional side view of a section of the wear liner assembly of FIG. 1.
Figure 6:
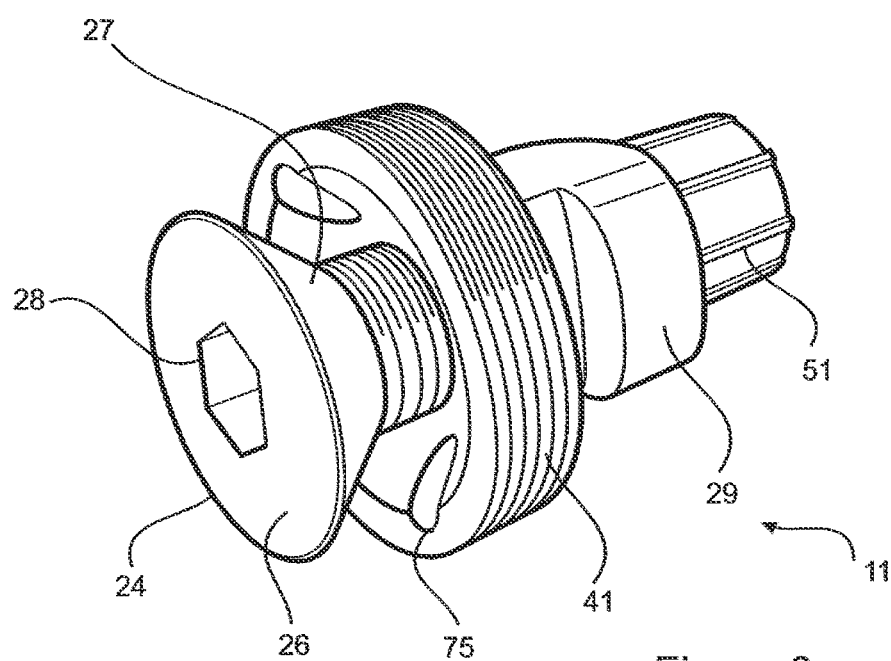
FIGS. 6 and 7 are assembled views of the fastener assembly of the wear liner assembly shown in FIG. 1.
Figure 7:
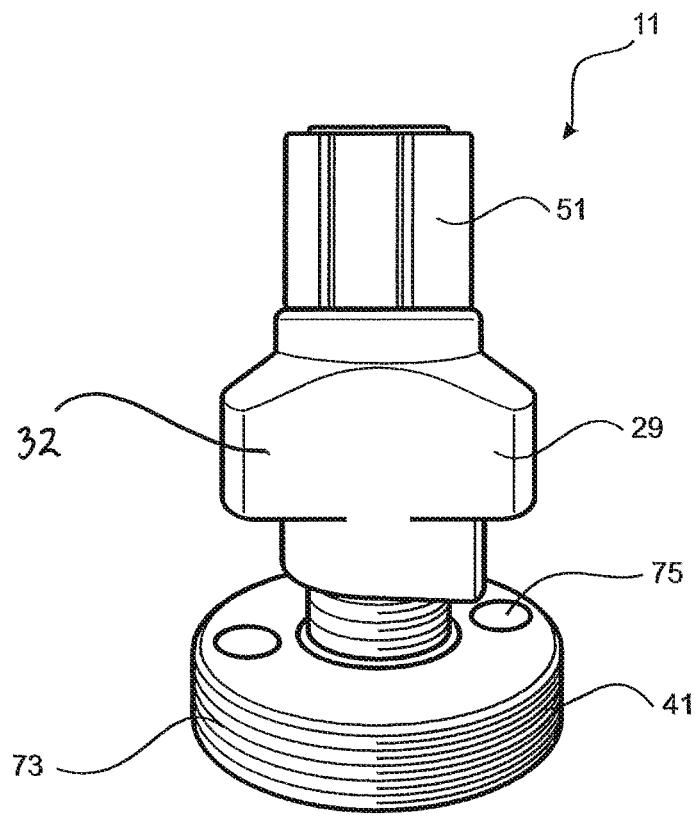
Figure 8:
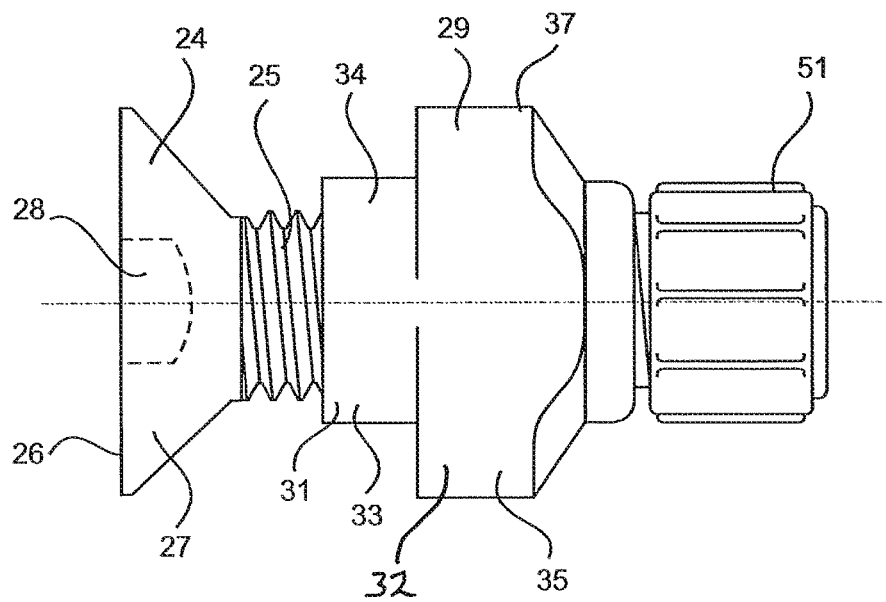
FIG. 8 is an assembled view of the fastener assembly of FIGS. 6 and 7 without an insert.
Figure 9:
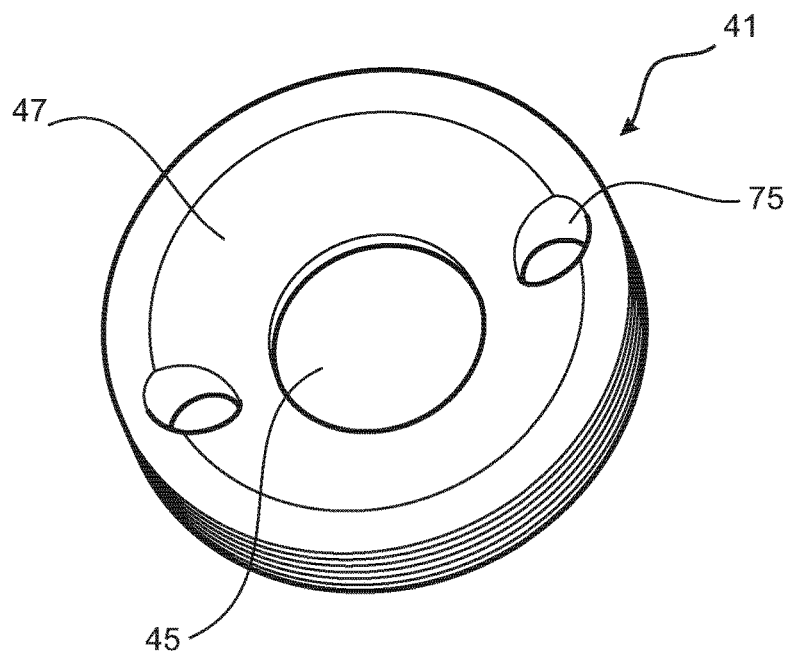
FIG. 9, 10, 11 are various views of the insert which forms part of the fastener assembly of the first embodiment.
Figure 10:
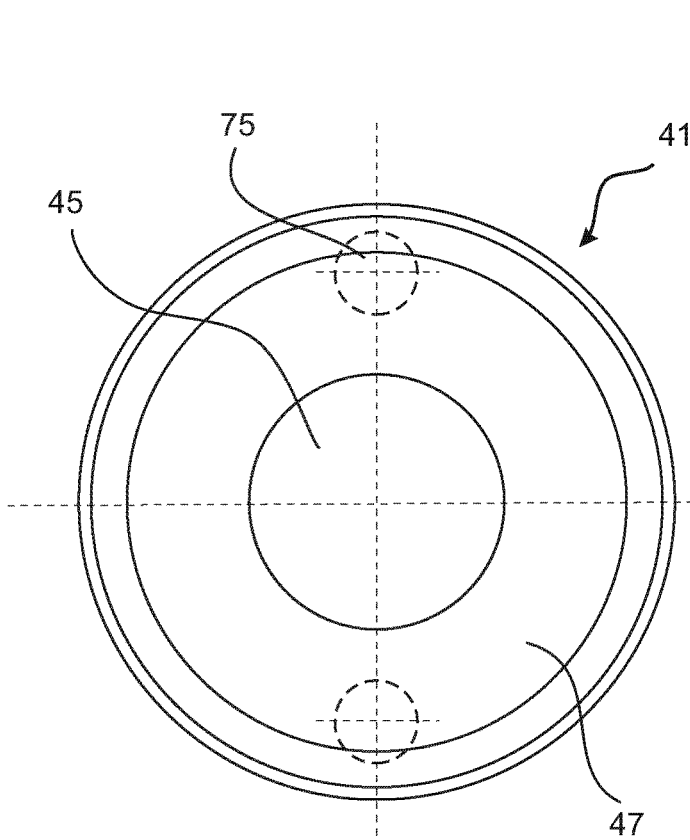
Figure 11:
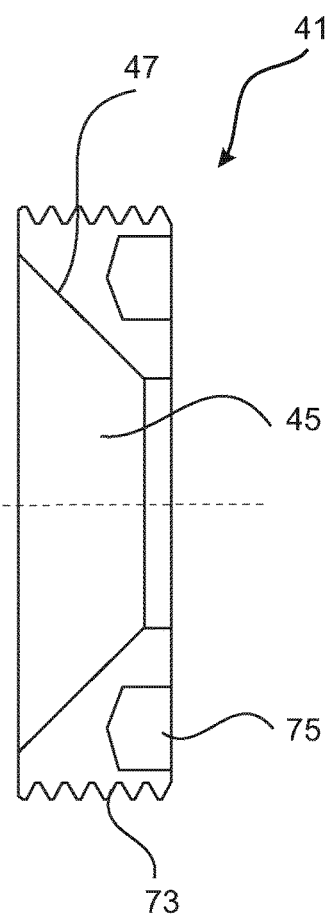

As best shown in FIG. 5 the structure provides a first structure surface 16 which is a rear side and is typically concealed or not readily accessible during liner replacement. The structure also provides a second structure surface 18 against which the wear liner 14 is secured.

The wear liner 14 comprises a first surface 20, which is adapted to be secured against the second structure surface 18 of the structure 15 and a second surface 22, which is exposed to wear. The wear liner comprises a plurality of wear liner apertures 57 to assist in securing the ceramic wear liner assembly to the structure, as is described below.

For ease of illustration the structure 15 is represented by a plate section having a slot 21 formed therein. In practice the number of slots required equals the total number of fastener assemblies 11 incorporated in the total number of ceramic wear liner assemblies 13.

Referring to FIGS. 6 to 11, each fastener assembly 11 comprises a first fastening portion in the form of a bolt 23, a second fastening portion in the form of a nut 29, an insert 41 and a prevention means provided by a limiting means in the form of a collar 51.

The bolt 23 comprises a bolt head 24 and a threaded shank 25. The bolt head 24 comprises a planar upper surface 26 and a body 27 extending inwardly as it extends away from the planar upper surface 26 such that the bolt head 24 is of the countersunk type. The bolt head 24 also comprises a tool recess 28 for reasons which will be described below.

The nut 29 provides a locking element 32 comprising a first portion 31 comprising two cam surfaces 33. As a result of the cam surfaces 33 the cross sectional profile of the first portion 31 is of a rectangular configuration modified such that two diagonally opposed corners 34 are curved. In use, this allows the nut 29 a limited degree of rotation between an unlocked position and a locked position, as is discussed below. During installation of the ceramic wear liner assembly 13 a part of the first portion 31 remains within the slot 21. When the ceramic wear liner assembly 13 is installed the majority of the first portion 31 is retained in the slot 21. The first portion may provide the restraining portion.

Figure 13:
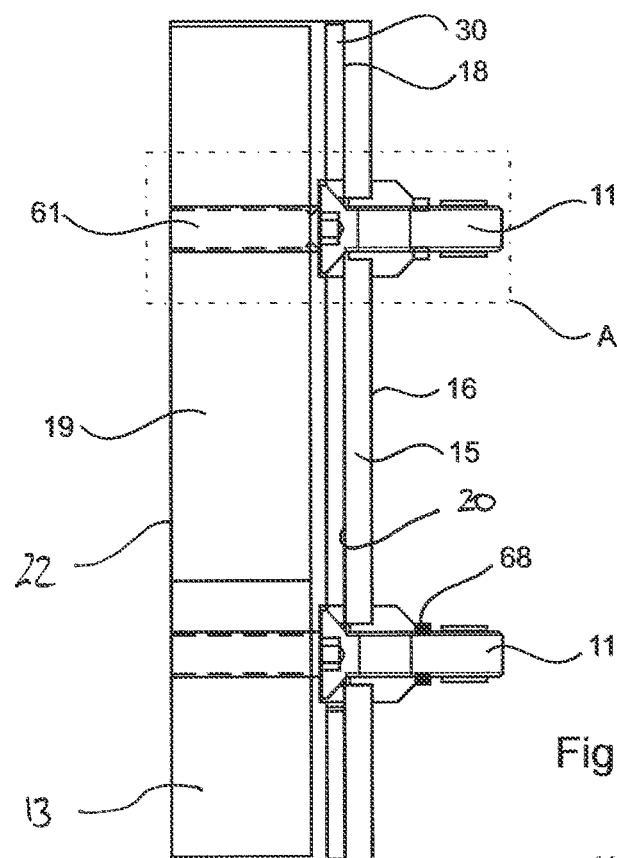
FIG. 13 is a cross sectional side view of the wear liner assembly according to a second embodiment of the invention shown secured to a structure and wherein the upper aperture is plugged with the plug of FIG. 12.
Figure 14:
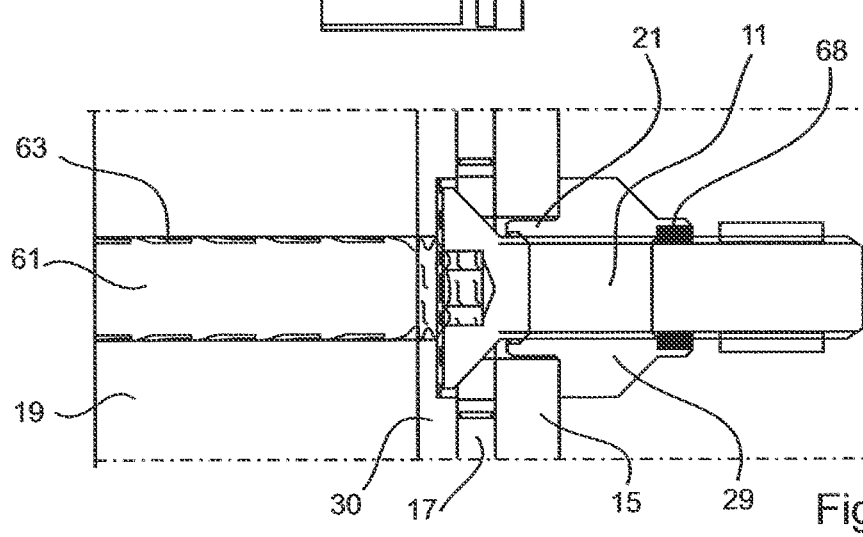
FIG. 14 is a detailed view of section A of FIG. 13.

The nut 29 also comprises a second portion 35 comprising two arms 37 extending outwardly relative to the first portion 31 in an opposed relation. As the wear liner 14 is being installed, the second portion 35 is aligned with the slot 21 such that the arms 37 can pass entirely through the slot 21. Once the wear liner 14 is in position the second portion 35 remains external the slot 21, as best shown in FIGS. 13 and 14.

An end of the nut 29 adjacent the collar 51 is adapted to receive a washer 68. The washer 68 enables the nut 29 to be releasably locked relative to the shank. In alternative embodiments a binding agent may be applied to the shank and/or nut to bind the two elements together.

When installing the wear liner 14, the second portion 35 of the nut 29 is adapted to be received through and cooperate with the rear side of the slot 31 to retain the bolt 23 relative to the structure 15.

The extent of the arms 37 is less than the length of the slot 21 such that the second portion 35 may be received therethrough.

The insert 41 is adapted to be threadingly received in a hole 43 in the backing plate which is in the form of a threaded hole 43. Prior to installing the fastener assembly in the backing plate the insert 41 receives the shank 25 of the bolt 23 through insert opening 45 such that the bolt head 24 is seated in the insert 41. The insert 41 has a countersunk region 47 which is similar in shape to the bolt head 24 but where the chamfer angle is sharper. This allows a larger tension to be generated in the bolt for a given amount of torque thereby providing a larger clamping force to ensure better attachment of the ceramic wear liner assembly 13 to the structure 15.

The insert 41 has a threaded external sidewall 73 extending therealong. The insert 41 also comprises two dimples 75 adapted to receive a tool (not shown). This allows the insert 41 to be screwed into and out of the threaded hole 43.

The collar 51 is in the form of a metal sleeve which is crimped to an end portion 53 of the shank. The collar may be in many forms such as a plastic cap, a projection extending from the shank, a lockable nut.

As best shown in FIG. 5, once assembled, the ceramic wear liner assembly 13 has a portion of each fastener assembly encapsulated/contained within the wear liner 14. In the embodiment shown the backing plate 17 has two holes 43 formed therein. These extend to at least the same depth as the thickness of the insert 41 such that when the insert is threadingly received therein the insert is flush with or slightly inward of the first surface 20 of the wear liner 14. In those applications where the backing plate is thinner than the thickness of the insert, the hole extends into the bonding material 30 between the ceramic tile 19 and the backing plate 17 to accommodate the insert.

The bolt 23 can be received in the insert 41 such that when the fastener assembly 11 is positioned in the hole 43 of the backing plate 17, the shank 25 extends from the rear of the backing plate 17, and the bolt head is seated in the countersunk region 47 of the insert 41.

Once the bolt 23 is positioned in the insert 41, the nut 29 may then be threadingly received on the shank 25 before the collar 51 is crimped onto the end portion 53 of the shank 25. As the nut 29 is placed on the shank 25 a binding agent can be used. Once the binding agent sets the nut 29 will remain in its position on the shank 25 until sufficient force is exerted thereon to break the bond. This is discussed in further detail below.

Once the fastener assembly 11 is installed the planar upper surface 26 of the bolt head 24 is below the edge of the insert 41. This allows the bolt 23 to rotate freely.

The ceramic tile 19 has aperture 57 therethrough for each fastener assembly 11. Each aperture 57 aligns with each respective bolt head and is sufficient in size to allow a tool to pass through and engage the tool recess 28 in each bolt head 24 for rotating the bolt in order to tighten the fastening assembly 11. However, each aperture 57 is smaller in diameter than the bolt head. Once each fastener assembly 11 has been tightened the aperture 57 may be sealed with a plug 61.

Figure 12:
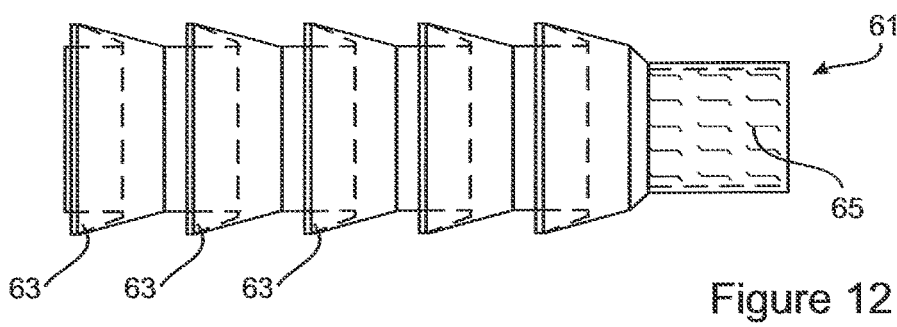
FIG. 12 is a side view of a plug used to plug the aperture in the wear liner assembly of FIG. 2.

As best shown in FIG. 12, the plug 61 comprises an elongate element having a plurality of flexible, annular skirts 63 at spaced apart intervals along the longitudinal extent. The annular skirts 63 are larger in diameter than the diameter of the aperture 57 the plug is received.

A first end 65 of the plug is hollow. Prior to being inserted in the aperture 57 of the ceramic tile 19 the hollow first end 65 is filled with a sealing medium such as grease. When the plug 61 is inserted in the aperture 57 the end of the plug 61 abuts the planar upper surface 26 of the bolt head 24 and begins to collapse. As the plug 61 is pushed further in, the end 65 continues to collapse forcing the grease into the tool recess 28 and into the cavity around the bolt head 24 and aperture 57, as best shown in FIG. 14. Alternatively the first end 65 of the plug 61 is formed to be snugly received in the tool recess 28 in the bolt head 24. Once inserted in the aperture the annular skirts form a barb like engagement with the sidewalls of the aperture to hold the plug in place.

In operation the nut 29 is moveable between a locked position, wherein the second portion 35 is retained relative to the slot 21 and an unlocked position wherein the nut 29 can pass through the slot 21. When in the locked position, each arm 37 is blocked from passing through the slot 21 as it abuts or would abut a rear surface of the structure 15 adjacent the slot 21, preventing the nut from being removed from the slot 21. In this position the fastening assembly 11 secures the ceramic wear liner assembly 13 to the structure 15.

The fastener assembly 11 of the first embodiment can be fitted to the wear liner 14 after the wear liner 14 has been formed. This is advantageous as the wear liner can be made elsewhere and more efficiently transported.

As the fastener assembly 11 is fitted after the wear liner 14 has been formed, the process of bonding/securing the ceramic tile 19 to the backing plate 17 is independent of fitting the fastener assembly 11. Therefore the operation of the fastener assembly 11 will not be compromised by the bonding material.

A second embodiment of the present invention is illustrated in FIGS. 13 and 14. The first and second embodiments differ only in the position of the planar upper surface 26 of the bolt head 24 of the fastener assembly 11. Comparing FIG. 5 of the first embodiment and FIG. 13 of the second embodiment it can be seen that the position of the planar upper surface 26 relative to an upper edge of an insert 41 differs. In the first embodiment the planar upper surface 26 is slightly below the upper edge of the insert 41. As a result no accommodation of the bolt head 24 is required in the bonding material 30. In the second embodiment the planar upper surface 26 is above the upper edge of the insert 41. As a result the bonding material 30 is formed to accommodate the bolt head 24 such that it can freely rotate.

A third embodiment of the invention is illustrated in FIGS. 15 to 18. For convenience features of the ceramic wear liner assembly 213 that are similar or correspond to features of the first embodiment have been referenced with the same reference numerals.

The ceramic wear liner assembly 213 of the second embodiment comprises a wear liner formed by a backing plate 217, a ceramic tile 219 secured thereto, and four first fastener portions. In alternative embodiments there may be more or less first fastener portions.

In this embodiment each first fastening portion is in the form of a bolt 223 and a second fastening portion in the form of a nut 229. The bolt is received in an insert 241 which is threadingly received in a hole 243 in the backing plate. The insert 241 is configured to receive the bolt in a manner whereby the bolt 223 is rotatably fixed relative to the backing plate. This is achieved by creating a key between the bolt and the insert 241.

In this embodiment the bolt is of a plough type bolt wherein a section 245a between the shank and the bolt head has a square cross section. In this embodiment the insert 241 is formed to have a complimentary square cross section 245b such that as the section 245a of the bolt enters the insert 241 the square sections align, locking/keying the bolt relative to the recess so that the bolt is unable to rotate. As the bolt is not rotatable the wear liner can only be secured to the structure by placing and tightening the nut on the bolt from the rear first structure surface 16 of the structure.

Figure 15:
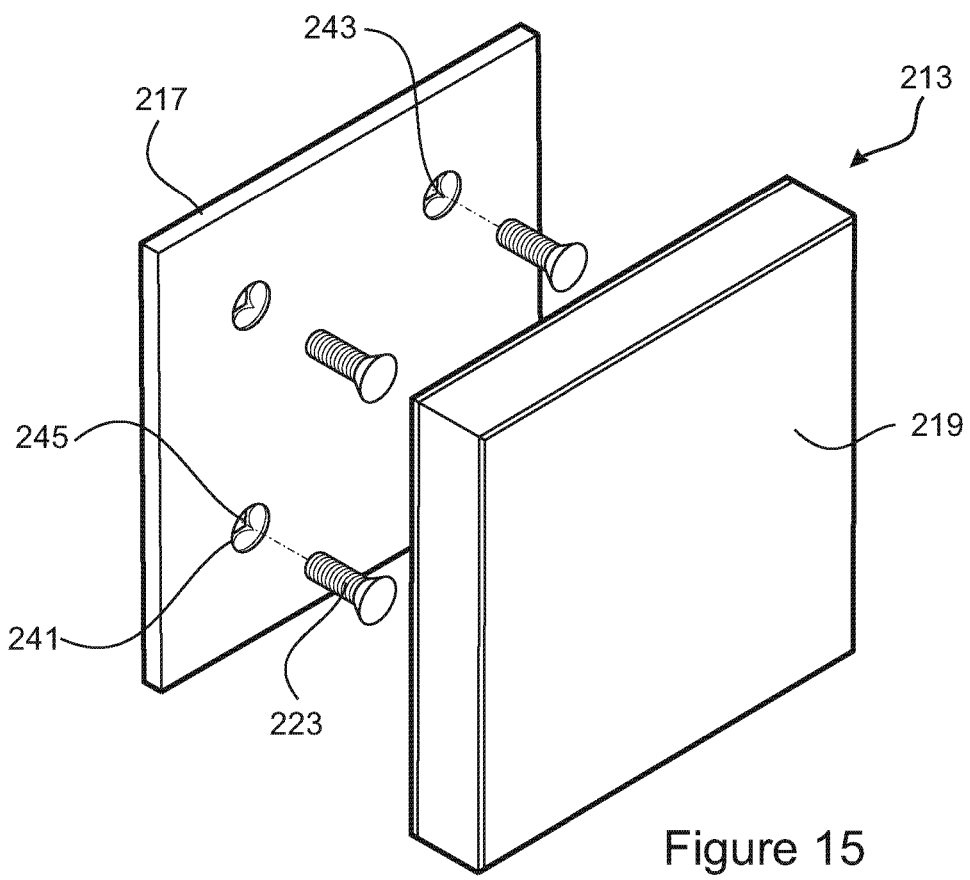
FIG. 15 is a front exploded perspective view of a wear liner assembly using a fastener assembly according to a third embodiment of the present invention.
Figure 16:
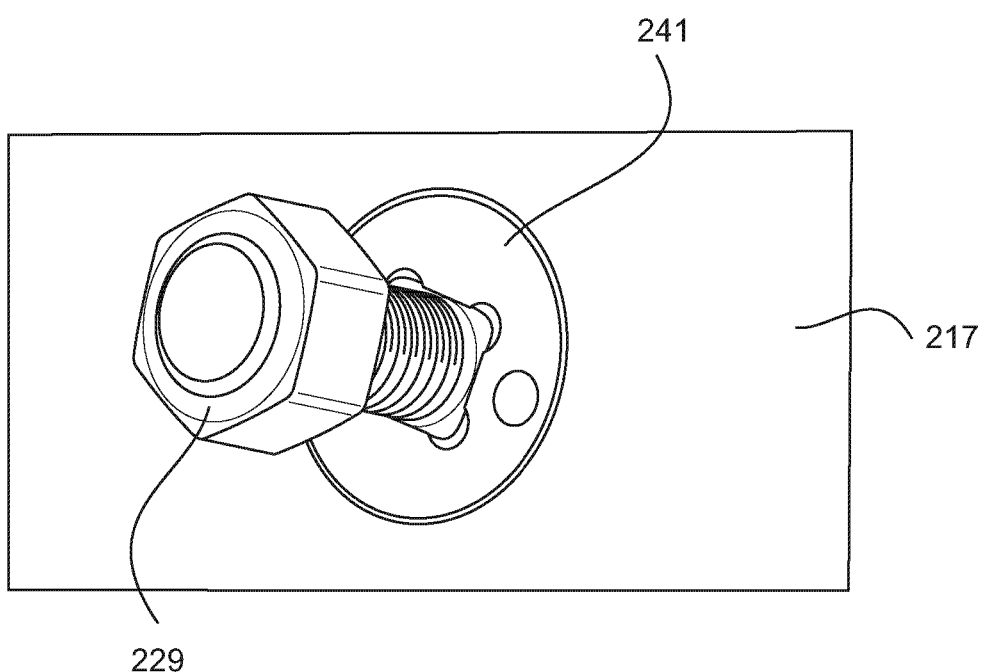
FIG. 16 is a rear view of a portion of the ceramic wear liner assembly shown in FIG. 15 wherein the fastener assembly of the wear liner assembly is received in the backing plate.
Figure 17:
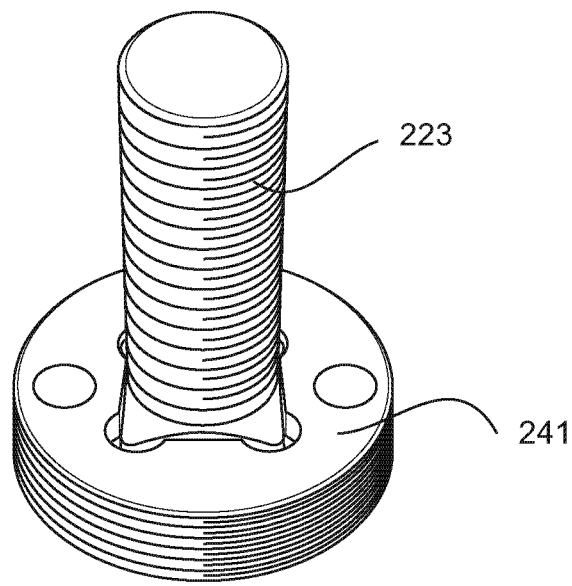
FIG. 17 is a perspective assembled view of the bolt and insert used in the third embodiment, as shown in FIGS. 15 and 16.
Figure 18:
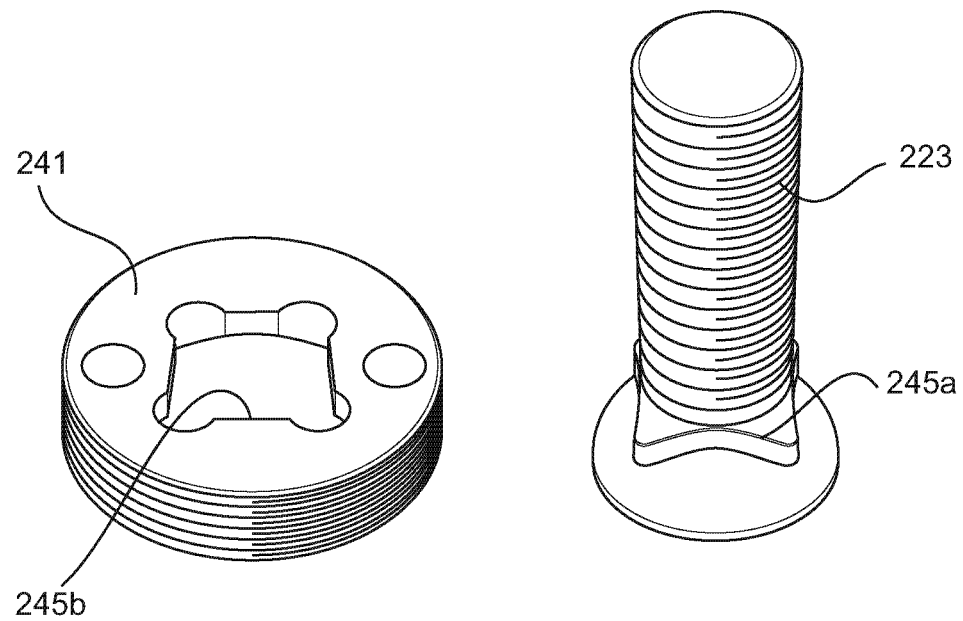
FIG. 18 is a perspective disassembled view of the bolt and insert used in the third embodiment, as shown in FIGS. 15 and 16.

Furthermore, as the bolt cannot rotate there is no requirement to have a hole in the ceramic tile for inserting a tool to rotate the bolt. As shown in FIG. 15, the ceramic tile 219 presents a continuous planar outer surface, which may be made up of a number of individual ceramic tiles (usually up to six).

Figure 19:
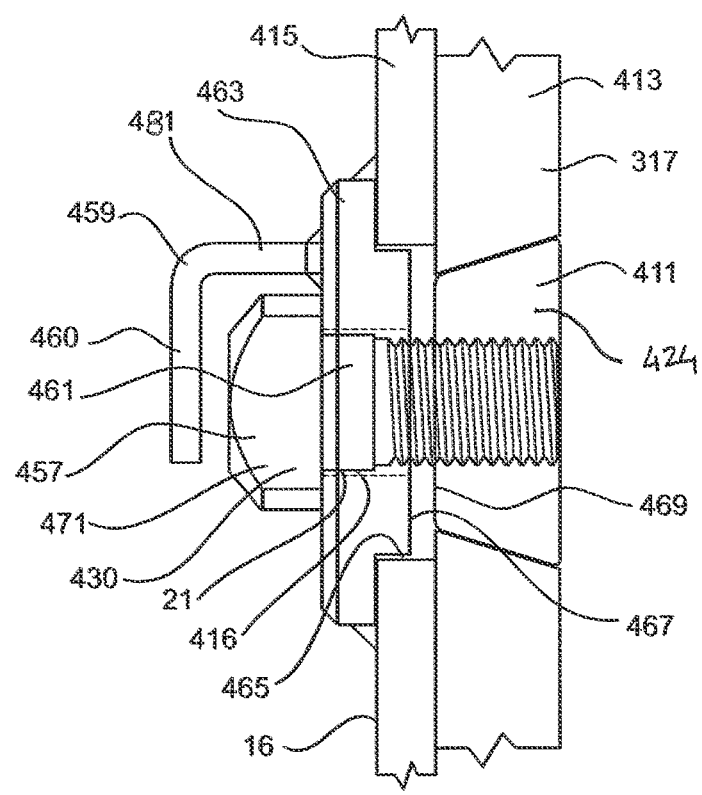
FIG. 19 is a cross sectional view of a fastener assembly of a wear liner assembly according to a fourth embodiment of the invention.
Figure 20:
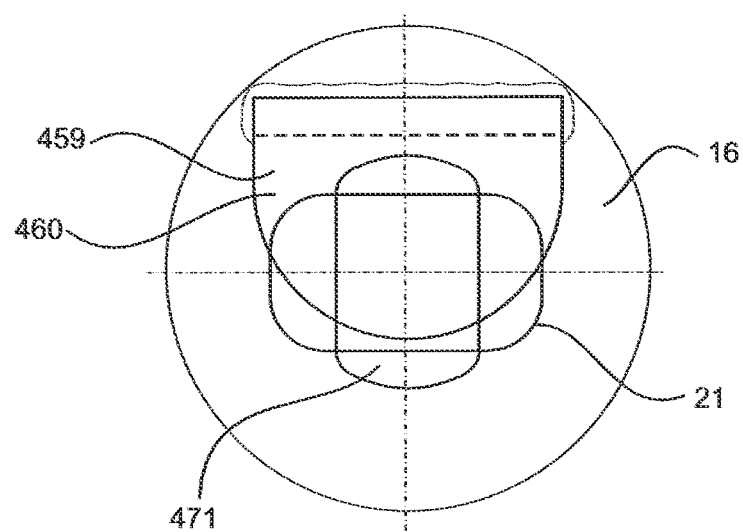
FIG. 20 is a rear view of FIG. 19.

A portion of a wear liner assembly 413 according to a fourth embodiment of the invention is illustrated in FIGS. 19 to 20. For convenience, features of the wear liner assembly 413 that are similar or correspond to features of the first embodiment have been referenced with the same reference numerals. The wear liner assembly 413 is shown secured to a structure 415 which, for simplicity, is shown as a plate.

The wear liner assembly 413 of this embodiment is similar to previous embodiments. The difference between this embodiment to previous embodiments is the prevention means. The prevention means is in the form of a restriction element 459 which provides an obstruction preventing the nut from passing entirely through the opening 416 of the structure 415.

The restriction element 459 is in the form of a projection 460 extending across the opening 416 wherein the projection 460 is spaced rearwardly from the rear side of the structure 415, as best shown in FIG. 19. The projection 460 is spaced a distance from the rear/first structure surface 16 of the structure 415 a distance less than the axial length of the nut 430, but more than the axial length of a pair of extending arms 471 of a locking element 457. This spacing does not hinder the operation of fastening the wear liner assembly 413 to the structure 415, but does ensure that a restraining portion 461 of the nut 430 remains within the opening should the nut 430 detach from the bolt. As the nut 430 remains captured within the opening 416 the nut does not pass through the opening to fall from the rear of the structure 415.

An elongate element 481 secures the projection 460 to an adapter 463. The adapter 463 is received/secured in a recess 465 in the rear side of the structure 415. In this arrangement the adapter 463 provides the opening, or an extension of the opening. In this embodiment the opening in the adapter provides a slot 21. As the slot is provided by the adapter the opening in the structure can be circular. The use of the slotted adapter makes retrofitting the present invention to current structures more feasible as it is easier to create a circular opening in an existing structure and use the slotted adapter than it is to form a slot in the structure.

When the wear liner assembly 413 is secured to a structure 415 there exists a gap between an inner surface 467 of the adapter 463 and the bottom surface 469 of the bolt head 424, as shown in FIG. 19. This ensures the fastener assembly

411 can be sufficiently fastened. In alternative embodiments the thickness of the bolt head may be reduced to ensure the existence of the gap.

As an alternative, the recess 465 in the structure may receive the adapter 463 so that the adapter is relatively flush with the first structure surface 16 of the structure 415.

The above embodiments are discussed in relation to a wear liner assembly wherein the wear liner comprises a backing plate and ceramic tile(s) bonded thereto. However, as would be understood by a person skilled in the art, the wear liner may comprise a backing plate, and one or more layers of any suitable material bonded thereto. Such variations are considered to fall within the scope of this invention.

Modifications and variations such as would be apparent to the skilled addressee are considered to fall within the scope of the present invention. The present invention is not to be limited in scope by any of the specific embodiments described herein. These embodiments are intended for the purpose of exemplification only. Functionally equivalent products, formulations and methods are clearly within the scope of the invention as described herein.

Reference to positional descriptions, such as lower and upper, are to be taken in context of the embodiments depicted in the figures, and are not to be taken as limiting the invention to the literal interpretation of the term but rather as would be understood by the skilled addressee.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A wear liner assembly for securing to a structure, the wear liner assembly comprising:
   a wear liner comprising a first material secured to a backing plate, the backing plate having at least one hole therethrough;
   a first fastener portion and a second fastener portion rotatably secured to the first fastener portion, the first fastener portion co-operates with the second fastener portion for securing the wear liner to the structure,
   wherein the first fastener portion has a portion of a first end encapsulated and retained within the wear liner such that the first fastener portion cannot be removed from the wear liner, and a portion of a second end extending through the at least one hole.

2. The wear liner assembly according to claim 1 wherein the portion of the first end of the first fastener portion is received in the backing plate so as to be housed within the wear liner.

3. The wear liner assembly according to claim 2 wherein the at least one hole of the backing plate incorporates a recess, wherein the recess supports the portion of the first end of the first fastener portion.

4. The wear liner assembly according to claim 1 wherein the first material is a first wear layer, the first wear layer providing an outer wear surface which is exposed to abrasive material passing through the structure.

5. The wear liner assembly according to claim 4 wherein the first wear layer comprises multiple layers of the same or different materials.

6. A wear liner assembly to be secured to a structure, the wear liner assembly comprising:
   a wear liner comprising a first material layer secured relative to a backing plate, the backing plate having at least one hole therethrough;
   at least one fastener assembly comprising a first fastener portion and a second fastener portion, the first fastener portion co-operates with the second fastener portion for securing the wear liner to the structure,
   wherein the first fastener portion is received in the at least one hole such that a portion of a first end of the first fastener portion is encapsulated and retained within the wear liner such that the first fastener portion cannot be removed from the wear liner.

7. The wear liner assembly according to claim 6 wherein the first material layer includes at least one aperture therethrough, the at least one aperture in the first wear layer being axially aligned with the at least one hole in the backing plate, the at least one aperture being smaller in diameter than a largest diameter of the first fastener portion.

8. The wear liner assembly according to claim 6 wherein the first material layer is a first wear layer, the first wear layer comprises one or more first wear units/tiles secured relative to the backing plate.

9. The wear liner assembly according to claim 8 wherein the wear liner comprises one or more further wear layers between the backing plate and the first wear layer.

10. The wear liner assembly according to claim 8 wherein the first wear layer is made from ceramic or a ceramic based material.

11. The wear liner assembly according to claim 8 wherein a first surface of the first wear layer is secured to a first surface of the backing plate the first surface of the first wear layer is bonded to the first surface of the backing plate using a bonding material.

12. The wear liner assembly according to claim 11 wherein the first surface of the first wear layer is planar and is substantially continuous between its edges.

13. The wear liner assembly according to claim 11 wherein the first wear layer has at least one aperture therethrough, whereupon installation the at least one aperture aligns with the first fastening portion.

14. The wear liner assembly according to claim 11 wherein an axial movement of the first fastener portion is limited by the first surface of the first wear layer or the bonding material.

15. The wear liner assembly according to claim 8 wherein the portion of the first end of the first fastener portion is positioned within the thickness of the backing plate.

16. The wear liner assembly according to claim 6 wherein the first fastener portion comprises a bolt having a bolt head and a shank wherein the bolt head provides the portion of the first end of the first fastener portion, and the shank provides a portion of a second end of the first fastener portion, the bolt head being retained within the wear liner and the shank extends from the bolt head through the at least one hole in the backing plate, through the backing plate to extend rearwardly therefrom.

17. The wear liner assembly according to claim 16 wherein the portion of the first end of the first fastener portion is freely rotatable while retained within the wear liner, an underside of the bolt head being flush with or inward of a first surface of the wear liner.

18. The wear liner assembly according to claim 16 wherein the bolt head has a tool recess which during installation and removal of the wear liner assembly co-operates with a tool for rotating the bolt, whereby at least one aperture of the first wear layer aligns with the tool recess of the bolt head, wherein a diameter of the aperture in the first wear layer is smaller than a diameter of the bolt head and larger than a diameter of a portion of the tool which enters the aperture.

19. The wear liner assembly according to claim 18 wherein the at least one aperture in the first wear layer is configured to be sealed once the wear liner is secured to the structure.

20. The wear liner assembly according to claim 19 wherein the at least one aperture in the first wear layer is sealed by a plug suitably secured therein such as by bonding, friction or material welding.

21. The wear liner assembly according to claim 16 wherein the portion of the first end of the first fastener portion is rotatably fixed when retained within the wear liner.

22. The wear liner assembly according to claim 21 wherein the bolt is keyed relative to the insert in the backing plate to prevent rotation of the bolt once the bolt head is received in the insert, the axial movement of the bolt in the wear liner being less than the axial movement required to disengage the bolt from the insert in a manner whereby the bolt is no longer keyed relative to the insert.

23. The wear liner assembly according to claim 6 wherein the fastener assembly further comprises an insert which is received in the backing plate.

24. The wear liner assembly according to claim 23 wherein the insert is threadingly received in the at least one hole, the at least one hole is in the form of a threaded aperture.

25. The wear liner assembly according to claim 6 wherein the portion of the first end of the first fastener portion is freely rotatable while retained within the wear liner.

26. The wear liner assembly according to claim 6 wherein the portion of the first end of the first fastener portion is in the form of a nut, wherein the nut is retained within the wear liner and positioned such that a threaded hole of the nut aligns with the at least one hole of the backing plate.

27. A wear liner assembly to be secured to a structure, the structure having a plurality of openings for securing the wear liner assembly thereto, the wear liner assembly comprising:
   a wear liner comprising a first wear layer secured to a backing plate;
   at least one fastener assembly for securing the wear liner to the structure, the at least one fastener assembly comprising:
   a first fastener portion in the form of a bolt head, encapsulated and retained within the wear liner such that the bolt head cannot be removed from the wear liner, whereby the bolt head is rotatable therein;
   a shank, having a threaded portion, the shank protruding from the bolt head, extending through the backing plate to extend rearwardly of the backing plate; and
   a second fastener portion in the form of a nut comprising a locking element which is rotatably positioned on the shank,
   whereupon installation on the structure a restraining portion of the locking element remains within one of the openings in the structure such that during rotation of the at least one fastener assembly the locking element is able to rotate between a first position to a second position where upon further rotation of the at least one fastener assembly the wear liner and structure are clamped between the bolt head and the locking element of the nut.

28. The wear liner assembly according to claim 27 wherein the fastener assembly further comprises an insert which is received in the backing plate, wherein the bolt head is received in the insert such that an upper surface of the bolt head sits below a top of the insert, the insert being secured to a hole in the backing plate.

29. The wear liner assembly according to claim 27 further comprising a prevention means to prevent the second fastener portion from passing completely through the opening in the structure when received therein, the prevention means is selected from a restriction element or a collar.

30. A wear liner assembly for securing to a structure, the wear liner assembly comprising:
   a wear liner comprising a first material secured to a backing plate, the backing plate having at least one hole therethrough;
   a first fastener portion in the form of a bolt wherein the first fastener portion is received in the at least one hole, a bolt head of the bolt is housed within the wear liner to be retained therein, such that the bolt is not removable therefrom.

31. A wear liner assembly for securing to a structure, the wear liner assembly comprising:
   a wear liner comprising a first material secured to a backing plate, the backing plate having at least one hole therethrough; and
   a first fastener portion in the form of a bolt, and a second fastener portion in the form of a nut providing a locking element rotatably secured to a shaft of the bolt, the bolt co-operates with the nut for securing the wear liner to the structure,
   wherein a bolt head of the bolt is encapsulated and retained within the wear liner such that the bolt cannot be removed from the wear liner, and wherein a portion of the nut extends through the at least one hole.

32. A wear liner assembly for securing to a structure, the wear liner assembly comprising:
   a wear liner comprising a first material secured to a backing plate, the backing plate having at least one hole therethrough; and
   a first fastener portion in the form of a bolt which co-operates with a second fastener portion for securing the wear liner to the structure,
   wherein the bolt has a bolt head encapsulated and retained within the wear liner such that the bolt cannot be removed from the wear liner.

33. The wear liner assembly according to claim 32 wherein the first fastener portion comprises a bolt having a bolt head and a shank wherein the bolt head provides the first end of the first fastener portion, and the shank provides a second end of the first fastener portion, the bolt head being retained within the wear liner and the shank extends from the bolt head through the at least one hole in the backing plate, through the backing plate to extend rearwardly therefrom.

34. The wear liner assembly according to claim 32 wherein the first end of the first fastener portion is in the form of a nut, wherein the nut is retained within the wear liner and positioned such that a threaded hole of the nut aligns with the at least one hole of the backing plate.

* * * * *